United States Patent [19]

Coran et al.

[11] 4,130,534
[45] Dec. 19, 1978

[54] ELASTOPLASTIC COMPOSITIONS OF BUTYL RUBBER AND POLYOLEFIN RESIN

[75] Inventors: Aubert Y. Coran; Raman P. Patel, both of Akron, Ohio

[73] Assignee: Monsanto Company, St. Louis, Mo.

[21] Appl. No.: 754,412

[22] Filed: Dec. 27, 1976

[51] Int. Cl.$^2$ .................... C08F 299/00; C08L 23/22
[52] U.S. Cl. .................... 260/33.6 AQ; 260/42.35; 260/42.36; 260/845; 260/846; 260/888; 260/889
[58] Field of Search ............... 260/888, 889, 33.6 AQ, 260/846

[56] References Cited

U.S. PATENT DOCUMENTS

| 3,037,954 | 6/1962 | Gessler et al. | 260/298 |
| 3,073,797 | 1/1963 | Fischer et al. | 260/846 |
| 3,184,522 | 5/1965 | Zagar | 260/889 |
| 3,265,770 | 8/1966 | Edwards | 260/889 |
| 3,768,841 | 10/1973 | Byrne et al. | 260/848 |
| 3,909,463 | 9/1975 | Hartman | 260/846 |
| 4,059,651 | 11/1977 | Smith | 260/848 |

FOREIGN PATENT DOCUMENTS 955235  4/1964  United Kingdom ..................... 260/846

OTHER PUBLICATIONS

Hartman et al., A Report on the New Elastomeric Thermoplastics, SPE Journal, vol. 26, May 1970, pp. 62–68.

Primary Examiner—Murray Tillman
Assistant Examiner—Arthur H. Koeckert
Attorney, Agent, or Firm—L. R. Swaney

[57] ABSTRACT

Elastoplastic compositions are described comprising blends of cross-linked butyl rubber and thermoplastic polyolefin resin.

13 Claims, No Drawings

ELASTOPLASTIC COMPOSITIONS OF BUTYL RUBBER AND POLYOLEFIN RESIN

The invention relates to thermoplastic compositions containing polyolefin resins and butyl rubber, and, more particularly to elastoplastic compositions comprising blends of polyolefin resin and cross-linked butyl rubber.

BACKGROUND OF THE INVENTION

It is known to prepare thermoplastic blends of cross-linked rubbery polymers such as butyl rubber and polypropylene, useful whenever a high tensile strength semi-rigid plastic is required, by dynamic cure of the blends, Gessler et al, U.S. Pat. No. 3,037,954. The rubbery polymer is about 5 to 50% of the total of rubbery polymer and polypropylene. Dynamic curing is described as a process which initially forms a cross-linked or three dimensional structure which, thereafter, is broken down and dispersed in the uncross-linked matrix polymer as a micro gel.

It is also known that blends of elastomeric and alkene plastomeric polymers can be prepared by mixing together in an internal mixer 100 parts by weight of polyethylene and 5 to 70 parts by weight, preferably 5–50 parts by weight of an elastomeric polymer such as butyl rubber, a free radical type catalyst and a bifunctional aromatic compound to produce blends useful in the production of harder, tougher and more durable burst resistant rigid pipes, Fischer U.S. Pat. No. 3,073,797.

Similarly, it is known to blend from about 60%–85% by weight of an ethylene copolymer, having up to about 5% of an alpha olefin copolymerized with the ethylene with 15 to 40% by weight of butyl rubber to provide a composition which is easily cured or vulcanized either prior to the formation of a shaped article such as tubular film or simultaneously with the formation of the shaped article, Zagar U.S. Pat. No. 3,184,522.

More recently, extrudable thermoplastic modified olefin polymers have been described which are prepared by mixing and heating at least about 40 parts by weight of an unsaturated olefin polymer up to 60 parts by weight of an unsaturated uncured synthetic rubber, such as butyl rubber, and a minor amount of a bifunctional phenolic material, Hartman U.S. Pat. No. 3,909,463. The conditions were designed to avoid crosslinking or vulcanization and to prepare grafted block copolymers, instead. The copolymers contain the polyolefin in an amount of at least 50% by weight.

The preparation of elastomeric composition, i.e., compositions having predominantly elastomeric character of butyl rubber have heretofore eluded the art because, it is believed, of the mistaken belief that mixing and heating a butyl rubber-polyolefin blend having a high proportion of butyl rubber with curing agents would necessarily give a "scorched" granulated thermoset. See in this connection, Hartman supra and Fischer U.S. Pat. No. 3,806,558, which with reference to EPDM rubber and polyolefin, teaches that the rubber must be only partially cured to attain fabricability.

SUMMARY OF THE INVENTION

Elastomeric compositions of vulcanized butyl rubber and polyolefin resins have now been found which have predominantly the elastomeric character of cured butyl rubber; but which are, nevertheless, reprocessable as thermoplastics, i.e., the compositions are elastoplastics. It has further been found that elastoplastic compositions comprising blends of cured butyl rubber and minor proportions of thermoplastic crystalline polyolefin resin can be prepared which possess an unexpected balance of properties heretofore not achieved. They are soft (low hardness), tough, strong elastomeric compositions processable as thermoplastics which exhibit excellent high temperature dimensional stability. The compositions of the invention can be extended greatly with extender oil without serious diminution of properties leading to inexpensive compositions exhibiting extraordinary oil resistance.

The elastoplastic compositions of the invention comprise blends of (a) thermoplastic crystalline polyolefin resin, (b) butyl rubber, cross-linked to the extent that it is at least 90% insoluble in boiling xylene, or to the extent that it contains at least $2 \times 10^{-5}$ "moles" of effective cross-links per milliliter, and (c) optionally, extender oil. Blends containing insufficient amounts of polyolefin resin are incoherent compositions resembling scorched rubber which blends are not processable as thermoplastics. The relative proportions of polyolefin resin and butyl rubber necessary to provide sufficient polyolefin resin to give thermoplastic compositions cannot be defined with precision because the limits vary depending upon a number of factors, such as, the kind of the resin or rubber, the presence of rubber extender oil and other ingredients, and the extent the rubber is cross-linked. For example, oil-extended butyl rubber containing up to 200 parts by weight extender oil per 100 parts by weight butyl rubber can be used in place of neat butyl rubber to obtain elastoplastic compositions of the invention in which the proportion of polyolefin resin is lower than required to obtain elastoplastic compositions when only polyolefin resin and butyl rubber are used alone without extender oil. Also, blends containing highly cross-linked rubber require more polyolefin resin to maintain thermoplasticity than blends in which the rubber is cross-linked to a lesser extent. However, the relative proportion of resin and butyl rubber in any composition necessary to obtain elastoplasticity is readily determined by preparing blends as hereinafter described and observing the properties and fabricability of the resulting composition.

In general, elastoplastic compositions of the invention may comprise about 60 parts by weight or less of polyolefin resin and about 40 parts by weight or more, preferably at least 50 parts by weight, of butyl rubber per 100 total parts by weight of butyl rubber and polyolefin resin. Preferred compositions are those in which the amount of polyolefin resin is sufficient to impart thermoplasticity to the composition up to 45 weight percent of the combined weight of said resin, butyl rubber and extender oil, the amount of butyl rubber is sufficient to impart rubberlike elasticity to the composition up to 80 weight percent of the combined weight of said resin, rubber and extender oil and the amount of extender oil is 0-200 weight percent of the butyl rubber. When the amount of resin exceeds 45 weight percent of the blend, the resulting compositions exhibit reduced toughness and reduced high temperature dimensional stability and are harder; in addition the improvement in tensile properties resulting from curing the rubber is greatly reduced. The amount of butyl rubber may be as high as 80 weight percent or more based upon the total weight of the rubber and resin in the blend when no extender oil is present but may be as low as about 18 weight percent of the combined weight of polyolefin resin, rubber and extender oil when large amounts of extender oil are used.

More preferred elastoplastic compositions of the invention, in increasing order of preference, comprise blends of 15 to about 45 parts by weight thermoplastic crystalline polyolefin resin, and correspondingly about 85 to about 55 parts by weight of cross-linked butyl rubber or cross-linked oil-extended butyl rubber, blends of about 20 to about 45 parts by weight of polyolefin resin and about 80 to about 55 parts by weight of cross-linked butyl rubber per 100 total parts by weight of resin and rubber and blends exhibiting high elasticity comprising about 25 to about 45 parts by weight polyolefin resin, preferably, polypropylene, and about 75 to about 55 parts by weight cross-linked butyl rubber per 100 total parts by weight resin and rubber.

To obtain the elastoplastic compositions of the invention, it is essential that the butyl rubber is cross-linked to the extent that the gel content is at least 90 percent or more, and preferably, the rubber is cross-linked to the extent that it is substantially completely gelled (e.g. at least 97% insoluble). Failure to adequately cross-link the rubber gives low strength compositions having reduced toughness and dimensional stability and which cannot accept significant quantities of extender oil. Generally, the elasticity of the composition is enhanced with higher proportions of butyl rubber and with increasing cross-link density of the butyl rubber. The elastoplastic compositions of the invention are elastomeric and processable as thermoplastic although the rubber is cross-linked to a point where it is at least 90 percent insoluble in an organic solvent for the unvulcanized rubber (such as boiling xylene) and thermoplasticity is retained even when the rubber is cross-linked to the extent that the rubber is essentially completely insoluble. The blends of the invention are envisaged as comprising microsized particles of cross-linked rubber dispersed throughout a continuous polyolefin resin phase.

The thermoplastic elastomers (elastoplastic compositions) of the invention are rubbery compositions in which the rubber portion of the blend is cross-linked to a gel content of 90% or more or a cross-link density of $2 \times 10^{-5}$ or more moles of effective cross-links per milliliter of rubber. The procedure appropriate for evaluating the extent of cure depends upon the particular ingredients present in the blends. The properties of the compositions can be improved by further cross-linking the rubber until it is essentially completely cured which state of cure is indicated by a gel content of 95% or more. However, in this connection, essentially complete gelation of say 97% or 98% or more is not always a necessary criterion of a fully cured product because of differences in molecular weight, molecular weight distribution and other variables among butyl rubbers which influence the gel determination. Determination of the cross-link density of the rubber is an alternative means of determining state of cure of the vulcanizates but must be determined indirectly because the presence of the polyolefin resin interferes with the determination. Accordingly, the same rubber as present in the blend is treated under conditions with respect to time, temperature, and amount of curative which result in a cured product as demonstrated by its cross-link density, and such cross-link density is assigned to the blend similarly treated. In general, an effective cross-link density of about $2 \times 10^{-5}$ of preferably, $3 \times 10^{-5}$ or more moles (number of cross-links divided by Avogadro's number) per milliliter of rubber is representative of the values for fully cured butyl rubber. An effect of curing the composition is the very substantial improvement in mechanical properties which improvement directly relates to its practical uses. Surprisingly, the high strength elastomeric compositions are still thermoplastic as contrasted to thermoset elastomers.

Vulcanizable rubbers, although thermoplastic in the unvulcanized state, are normally classified as thermosets because they undergo the process of thermosetting to an unprocessable state. The products of the instant invention, although processable as thermoplastics, are prepared from blends of butyl rubber and polyolefin resin which are treated under time and temperature conditions to cross-link the rubber or are treated with curatives in amounts and under time and temperature conditions known to give cured products from static cures of the rubber in molds and, indeed, the rubber has undergone gelation to the extent characteristic of rubber subjected to a similar treatment alone. Thermosets are avoided in the compositions of the invention by simultaneously masticating and curing the blends. Thus, the elastoplastic compositions of the invention are preferably prepared by blending a mixture of butyl rubber and polyolefin resin at a temperature above the melting point of the polyolefin resin, adding curatives, then masticating the blend at a temperature sufficient to effect cross-link formation, using conventional masticating equipment, for example, Banbury mixer, Brabender mixer or certain mixing extruders. The polyolefin resin and rubber are mixed at a temperature sufficient to soften the resin or, more commonly, at a temperature above its melting point. After the molten polyolefin resin and rubber are intimately mixed, curative is added. Heating and masticating at vulcanization temperatures are generally adequate to complete the cross-link formation in a few minutes or less, but if shorter times are desired, higher temperatures may be used. A suitable range of temperatures for cross-link formation is from about the melting temperature of the polyolefin resin to the decomposition temperature of the rubber which range commonly is from about 125° C. to 270° C. with the maximum temperature varying somewhat depending upon the composition, the presence of antidegradants and the mixing time. Typically, the range is from about 160° C. to 250° C. A preferred range of temperatures is from about 180° C. to about 230° C. To obtain thermoplastic compositions, it is important that mixing continues without interruption until cross-linking occurs. If appreciable cross-linking is allowed after mixing has stopped, a thermoset unprocessable composition may be obtained. A few simple experiments within the skill of the art utilizing available rubbers and curative systems will suffice to determine their applicability for the preparation of the improved products of this invention. For additional information on dynamic cross-linking processes, see Gessler and Haslett, U.S. Pat. No. 3,037,954.

Methods other than the dynamic vulcanization of butyl rubber/polyolefin resin blends can be utilized to prepare compositions of the invention. For example, the rubber can be fully vulcanized in the absence of the resin, either dynamically or statically, powdered, and mixed with the resin at a temperature above the melting or softening point of the polyolefin resin. Provided that the cross-linked rubber particles are small, well dispersed and in an appropriate concentration, the compositions within the invention are easily obtained by blending cross-linked rubber and polyolefin resin. Accordingly, the term "blend" herein means a mixture comprising well dispersed small particles of cross-linked rubber. A mixture which is outside of the invention because it contains poorly dispersed or too large rubber particles can be comminuted by cold milling (to reduce particle size to below about 20μ) preferably below 10μ and more preferably to below 5μ. After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The term "butyl rubber" as used herein and the claims means rubbery amorphous copolymers of isobutylene and isoprene containing 0.5 to 10, more preferably 1 to 4 percent by weight isoprene and said copolymers halogenated with from 0.1 to about 10, preferably, 0.5 to 3.0 weight percent chlorine or bromine which chlorinated copolymer is commonly called chlorinated butyl rubber. Any butyl rubber is satisfactory for the practice of this invention but halogen-free butyl rubber containing 0.6 - 3.0% unsaturation is preferred with butyl rubber having a polydispersity of 2.5 or below being especially preferred. Butyl rubbers are prepared by polymerization at low temperature in the presence of a Friedel-Crafts catalyst. U.S. Pat. Nos. 2,356,128 and 2,944,576. Butyl rubber is commercially available, for example, see pages 412–414 of Rubber World Blue Book, 1975 Edition, Materials and Compounding Ingredients for Rubber.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Atactic non-crystalline polyolefin polymers are unsuitable. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resin, and preferably polyethylene or polypropylene, may be advantageously used in the practice of the invention, with polypropylene being preferred.

The compositions of the invention are all processable in an internal mixer, to products which, upon transferring at temperatures above the softening or crystallizing points of the resin phase, to the rotating rolls of a rubber mill, form continuous sheets. The sheets are reprocessable in the internal mixer, after reaching temperatures above the softening or melting points of the resin phase. The material is again transformed to the plastic state (molten state of the resin phase) but upon passing the molten product through the rolls of the rubber mill a continuous sheet again forms. In addition, a sheet of elastoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion, injection molding, calendering, vacuum forming, hot stamping, etc.

When the determination of extractables is an appropriate measure of the state of cure, an improved elastoplastic composition is produced by cross-linking a blend to the extent that the composition contains no more than about ten percent by weight of the rubber extractable by boiling in xylene for one hour, and preferably to the extent that the composition contains less than four percent by weight extractable and more preferably less than two percent by weight extractable. In general, the less rubber extractable the better are the properties, although, respectable properties are obtained with rubber extractable as high as ten percent of the incorporated rubber, more preferable compositions comprise less than five percent extractable rubber. Alternately, gel content reported as percent gel may be determined by the procedure of U.S. Pat. No. 3,203,937 which comprises determining the amount of insoluble rubber by soaking the specimen for 48 hours in a solvent for the rubber at room temperature and weighing the dried residue and making suitable corrections based upon knowledge of the composition. Thus, corrected initial and final weights are obtained by subtracting from the initial weight, the weight of soluble components, other than the rubber, such as extender oils, plasticizers and components of the resin soluble in organic solvent. Any insoluble pigments, resin, fillers, etc., are subtracted from both the initial and final weights.

To employ cross-link density as the measure of the state of cure which characterizes the improved elastoplastic compositions, the blends are cross-linked to the extent which corresponds to cross-linking the same rubber as in the blend statically cross-linked under pressure in a mold with such amounts of the same curative as in the blend and under such conditions of time and temperature to give an effective cross-link density ($\nu/2$) greater than about $2 \times 10^{-5}$ moles per milliliter of rubber and preferably greater than about $3 \times 10^{-5}$ or even more preferably greater than about $4 \times 10^{-5}$ moles per milliliter of rubber. The blend is then dynamically cross-linked under similar conditions (with the same amount of curative based on the rubber content of the blend) as was required for the rubber alone. The cross-link density so determined may be regarded as a measure of the amount of vulcanization which gives the improved elastoplastics. However, it should not be assumed, from the fact that the amount of curative is based on the rubber content of the blend and is that amount which gives with the rubber alone the aforesaid cross-link density that the curative does not react with the polyolefin resin or that there is no reaction between the resin and rubber. There may be highly significant reactions involved but of limited extent so as not to cross-link the resin to the point to lose thermoplasticity. However, the assumption that the cross-link density determined as described provides a useful approximation of the cross-link density of the elastoplastic compositions is consistent with the thermoplastic properties and with the fact that a large proportion of the polyolefin resin can be removed from the composition by extraction with a solvent for the resin such as boiling xylene. In no event does the amount of polyolefin resin which has been rendered insoluble by cross-link formation by grafting onto rubber exceed three weight percent, generally one weight percent or less, of the amount of polyolefin resin in the composition.

The cross-link density of the rubber is determined by equilibrium solvent swelling using the Flory-Rehner equation, *J. Rubber Chem. and Tech.*, 30, p. 929. The appropriate Huggins solubility parameter for butyl rubber/cyclohexane, 0.433 used in the calculation was obtained from the review article by Sheehan and Bisio, *J. Rubber Chem. & Tech.*, 39, 167. If the extracted gel content of the vulcanized rubber is low, it is necessary to use the correction of Bueche wherein the term $v_r^{\frac{1}{3}}$ is multiplied by the gel fraction (% gel/100). The cross-link density is half the effective network chain density $v$ determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

The particular results obtained by the aforedescribed dynamic curing process are a function of the particular rubber curing system selected. The curatives and the curative systems conventionally used to vulcanize butyl rubbers are utilizable for preparing the improved elastoplastic compositions of the invention. Any curative or curative system applicable for vulcanizing butyl or halobutyl rubber may be used in the practice of the invention, for example, sulfur, phenolic resin, metal oxide, p-quinone dioxime, or bis-maleimide vulcanizing systems may be used. The selection of any particular vulcanizing systems varies depending upon the nature of the polyolefin resin and the rubber. However, an organic peroxide as the sole vulcanizing agent is not satisfactory but may be used in small amounts as a co-agent along with a difunctional cross-linking agent such as m-phenylene bismaleimide. Phenol-aldehyde resin curative systems are preferred with or without metal co-agents, especially preferred is a resin curative system comprising brominated phenolic-formaldehyde resin and zinc oxide. U.S. Pat. Nos. 3,189,567 and 3,220,964. High energy radiation is also utilizable as the curative means.

Examples of suitable di- and tri-functional crosslinking agents which may be used alone or with other cross-linking agents are dibenzo-p-quinonedioxime, p-quinonedioxime, n-phenylene bismaleimide, trialkyl cyanurate, ethylene glycol dimethacrylate, pentaerythritol triacrylate, trimethylolpropane triacrylate, and neopentylglycol diacrylate. Additional examples of acrylate cross-linking agents are described in U.S. patent 3,751,378. Conventional sulfur curative systems are also suitable either with sulfur vulcanizing agent alone or with sulfur and vulcanization accelerator.

The amount of curative varies depending upon the type of curative and the composition of the blend. Enough curative must be used to cross-link the rubber while avoiding excessive quantities of curatives beyond the amount necessary to fully cure the rubber which can result in diminution of properties. High quantities of curatives or curatives which lead to gelation of the resin which reduces thermoplasticity of the composition must be avoided.

The properties of the elastoplastic compositions of the invention may be modified, either before or after vulcanization, by addition of ingredients which are conventional in the compounding of butyl rubber, polyolefin resin and blends thereof. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, rubber plasticizers, wax, prevulcanization inhibitors, discontinuous fibers such as wood cellulose fibers and extender oils. The addition of carbon black, rubber extender oil or both, preferably prior to dynamic vulcanization, are particularly recommended. Preferably, the carbon black and/or rubber extender oil is masterbatched with the rubber and the masterbatch is mixed with the polyolefin resin. Carbon black can improve the tensile strength and increase the amount of extender oil which can be used. Extender oil can improve the resistance to oil swell, heat stability, hysteresis, cost and permanent set of the elastoplastic compositions. Aromatic, naphthenic and paraffinic extender oils are satisfactory. The addition of extender oil can also improve processability. For suitable extender oils, refer to Rubber World Blue Book, supra, pages 145–190. The quantity of extender oil added depends upon the properties desired, with the upper limit depending upon the compatibility of the particular oil and blend ingredients which limit is exceeded when excessive exuding of extender oil occurs. Typically, 5–300 parts by weight extender oil are added per 100 parts by combined weight of butyl rubber and polyolefin resin. Usually about 20 to 200 parts by weight of extender oil are added per 100 parts by weight of rubber present in the blend with quantities of about 50 to 150 parts by weight of extender oil per 100 parts by weight of butyl rubber being preferred. Typical addition of carbon black comprises about 20–200 parts by weight of carbon black per 100 parts by weight of rubber and usually 30–150 parts by weight carbon black per 100 parts total weight of rubber and extender oil. The amount of carbon black which can be used depends, at least in part, upon the type of black and the amount of extender oil present.

When extender oil is added to the rubber, the range of proportions of polyolefin resin to butyl rubber in the composition is extended while still retaining elastoplasticity. For example, with extender oil, the ratio of polyolefin resin to butyl rubber may be increased while still maintaining rubberlike properties. Oil-extended butyl rubber containing up to 200 parts by weight, preferably between 20–150 parts by weight, extender oil per 100 parts by weight butyl rubber are particularly suitable. Of course, it is understood that extender oil need not be present prior to curing the rubber, although it is generally more desirable, and that the properties of elastoplastic composition of the invention may be modified by addition of extender oil after the rubber is cured. Generally, the quantity of extender oil when present is between 5–40 weight percent of the total composition.

Elastoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics, in particular, polyolefin resins. The compositions of the invention are blended with thermoplastics using conventional mixing equipment. The properties of the blend depend upon the proportions. Generally, the amount is such that the blend contains sufficient cross-linked rubber to obtain the desired effect.

The stress-strain properties of the compositions are determined in accordance with the test procedures set forth in ASTM D638 and ASTM D1566. An approximate toughness is calculated by an abbreviated Griffith equation $(TS)^2/E$ (TS=tensile strength, E=Young's modulus). For a detailed analysis, refer to *Fracture*, edited by H. Liebowitz, published by Academic Press, New York, 1972, Ch. 6, Fracture of Elastomers by A. N. Gent. The term "elastoplastic" as used herein and the claims means the composition is both elastomeric as defined below and thermoplastic, i.e., the composition is processable as a thermoplastic as described supra. The term "elastomeric" as used herein means a composition which possesses the property of forcibly retracting within ten minutes to less than 160% of its original length after being stretched at room temperature to twice its length and held for ten minutes before release. Especially preferred compositions of the invention are rubbery compositions having tension set values of about 50% or less which compositions meet the definition for rubber as defined by ASTM Standards, V. 28, p. 756 (D1566). More preferred compositions are rubbery compositions having a Shore D hardness of 50 or below, more preferably 40 or below, or a 100% modulus of 110 Kg./cm$^2$ or less or a Young's modulus below 1000 Kg./cm$^2$.

DESCRIPTION OF PREFERRED EMBODIMENTS

To illustrate the invention, polyolefin resin, butyl rubber, and zinc oxide in the indicated proportions are mixed at 100 rpm in a Brabender mixer with an oil bath temperature of 180° C. After 3 minutes the polyolefin resin is melted and a uniform blend is obtained. Curatives are then added and mixing is continued until the maximum Brabender consistency is reached (about 3–5 minutes) and for 2 minutes thereafter. The composition is removed, sheeted, returned to the Brabender mixer and mixed for an additional two minutes at the indicated temperature. The composition is sheeted on a roll mill and then compression molded at 220° C. and cooled below 100° C. under pressure before removed. Properties of the molded sheet are measured and recorded.

Elastoplastic compositions illustrating the invention are shown in Table I. The butyl rubber is a copolymer of isobutylene and isoprene containing 1.6 mole percent unsaturation having a specific gravity of 0.915 and a Mooney Viscosity (ML 1+8 at 100° C.) of 70. The polypropylene is a low flow, general purpose isotactic resin having a specific gravity of 0.902 and 11% ultimate elongation. The curative is a brominated phenol-formaldehyde curing resin (U.S. Pat. No. 2,972,600) sold by Schenectady Chemicals, Inc. under the trade name SP-1056 resin. The amounts of all ingredients are in part by weight. The effect of varying the relative proportions of butyl rubber and polypropylene is shown in Table I. The value within parenthesis in the polypropylene column indicates the weight percent of polypropylene of the total composition. The examples designated A are controls which are blends prepared by the same procedure but without curatives. The examples designated B contain sufficient curative to fully cure the butyl rubber, i.e., the butyl rubber is cured to the extent that it is essentially insoluble in boiling xylene and has a cross-link density of about $5 \times 10^{-5}$ moles per ml. In Examples 1–8, ten parts by weight of curative are charged per 100 parts by weight butyl rubber. Except for Example 8, five parts by weight zinc oxide are charged per 100 parts by weight butyl rubber. All of the compositions containing cross-linked rubber in spite of the high proportion of cross-linked rubber are processable as thermoplastics and are elastomeric.

The data show that cross-linking the rubber results in substantial improvement in physical properties with the amount of improvement being dependent on the relative proportion of rubber and polypropylene in the blend. For example, tensile strength increases significantly upon cross-linking the rubber. However, the improvement in tensile strength is strongly dependent upon the ratio of polyolefin resin and butyl rubber in the blend. The data show that the improvement in tensile strength (shown in parenthesis) is greater when the amounts of polypropylene is between 45 and 25 parts by weight per 100 total parts by weight of polyolefin resin and rubber.

TABLE I

| Example No. | Butyl rubber | Polypropylene (Wt. %) | Curative | ZnO |
|---|---|---|---|---|
| 1A | 40 | 60 | — | — |
| 1B | 40 | 60 (56.6) | 4.0 | 2.00 |
| 2A | 50 | 50 | — | — |
| 2B | 50 | 50 (46.5) | 5.0 | 2.50 |
| 3A | 55 | 45 | — | — |
| 3B | 55 | 45 (41.5) | 5.5 | 2.76 |
| 4A | 60 | 40 | — | — |
| 4B | 60 | 40 (36.7) | 6.0 | 3.00 |
| 5A | 65 | 35 | — | — |
| 5B | 65 | 35 (31.9) | 6.5 | 3.27 |
| 6A | 70 | 30 | — | — |
| 6B | 70 | 30 (27.2) | 7.0 | 3.50 |
| 7A | 75 | 25 | — | — |
| 7B | 75 | 25 (22.5) | 7.5 | 3.76 |
| 8A | 80 | 20 | — | — |
| 8B | 80[1] | 20 (17.5) | 8.0 | 1.60 |

| Example No. | PP/Butyl | TS. Kg./cm$^2$ | 100%M, Kg./cm$^2$ | E, Kg./cm$^2$ | U.E., % | TS$^2$/E, Kg./cm$^2$ | True Stress at break, Kg./cm$^2$ | Ten.set, % | Hardness, Shore D | Dimen.Stab. % (at 185° C) |
|---|---|---|---|---|---|---|---|---|---|---|
| 1A | 60/40 | 155 | 129 | 3556 | 490 | 7 | 915 | 76 | 54 | — |
| 1B |  | 267 (112) | 146 | 2204 | 460 | 32 | 1495 | 44 (32) | 54 | +34.5 |
| 2A | 50/50 | 109 | 96 | 1994 | 400 | 6 | 545 | 77 | 45 | — |
| 2B |  | 238 (129) | 125 | 1373 | 380 | 41 | 1142 | 34 (43) | 46 | +10.3 |
| 3A | 45/55 | 86 | 79 | 1362 | 350 | 5 | 387 | 77 | 39 | — |
| 3B |  | 229 (143) | 105 | 927 | 410 | 57 | 1172 | 29 (48) | 42 | +5.2 |
| 4A | 40/60 | 57 | 52 | 620 | 320 | 5 | 239 | 78 | 29 | — |

TABLE I-continued

| | | All parts by weight | | | | | | | | |
|---|---|---|---|---|---|---|---|---|---|---|
| 4B | | 220 (163) | 95 | 636 | 380 | 76 | 1056 | 23 (55) | 39 | +6.3 |
| 5A | 35/65 | 33 | 31 | 200 | 390 | 5 | 162 | 79 | 19 | — |
| 5B | | 196 (163) | 76 | 331 | 390 | 116 | 960 | 17 (62) | 33 | −1.2 |
| 6A | 30/70 | 21 | 20 | 84 | 540 | 5 | 134 | 73 | 12 | — |
| 6B | | 187 (166) | 69 | 244 | 360 | 143 | 860 | 12 (61) | 30 | −3.5 |
| 7A | 25/75 | 6 | 8 | 20 | 1400 | 2 | 90 | 68 | 8 | — |
| 7B | | 159 (153) | 56 | 144 | 320 | 176 | 668 | 8 (60) | 26 | −5.8 |
| 8A | 20/80 | 4 | 6 | 13 | 1500+ | 1 | 64 | 42 | 4 | — |
| 8B | | 115 (111) | 45 | 100 | 290 | 132 | 450 | 6 | 21 | −3.5 |

[1] In addition contains 4.4 parts of neoprene rubber.

A plot of the increase in tensile strength against composition shows that the improvement in tensile strength peaks between 55 and 75 parts by weight butyl rubber per 100 total parts by weight of rubber and polypropylene. The data also show that stiffness and hardness of the compositions are reduced when the amount of polypropylene is 45 weight percent or less of the composition. Toughness ($TS^2/E$) is substantially improved when the amount of polypropylene is less than the amount of butyl rubber in the blend. The data also show that the improvement in elasticity (change in tension set shown in parentheses) is dependent upon the proportion of polypropylene present in the blend. A plot of the change in tension set against composition shows that the improvement in tension set peaks when the blend contains between 45 and 25 parts by weight polypropylene per 100 total parts by weight polypropylene and butyl rubber. Especially significant is the high temperature dimensional stability data which show that the compositions of Examples 3–8 exhibit greater high temperature dimensional stability than compositions containing greater amounts of polypropylene which resistance to deformation is important in those applications in which an article during use is exposed to high temperature. The property is determined by heating a 2 mm thick specimen at 185° C. for five minutes under a tensile stress of 0.2 Kg./cm² and measuring the change from original length after cooling under tension. Stability, expressed as percent change, is calculated by dividing the change in length by the length of the original sample prior to heating and multiplying by 100. A plus means an increase in length and a minus means a decrease in length has occurred during exposure to high temperature.

Elastoplastic compositions of the invention containing carbon black and extender oil are illustrated in Table II. The butyl rubber and polypropylene are the same as used in Table I, with all the examples containing 60 parts by weight butyl rubber and 40 parts by weight of polypropylene. The carbon black (N-110) and paraffinic extender oil (Sunpar 2280) in the indicated proportions are mixed with the butyl rubber before adding the polypropylene. Six parts by weight curing resin, three parts by weight zinc oxide and 0.6 parts by weight stearic acid are added after the polymers are thoroughly mixed. The procedure is the same as in Table I except the speed of the Brabender mixer is 80 rpm. All of the compositions, Examples 9–19 are elastomeric and processable as thermoplastics.

The data show that compositions containing large amounts of extender oil and carbon black possess respectable physical properties including tensile strength. It will be appreciated that the compositions of Table II represent economically attractive elastoplastics since carbon black and extender oil are less expensive than other ingredients especially butyl rubber. For instance, in Example 19 the composition exhibits useful physical properties but comprises only about 20 weight percent butyl rubber and about 13 weight percent polypropylene with about 64 weight percent of the composition being carbon black and extender oil.

TABLE II

| Example No. | Carbon black | Extender oil | TS, Kg./cm² | 100% M, Kg./cm² | E, Kg./cm² | U.E., % | Ten. Set, % | Hardness, Shore A |
|---|---|---|---|---|---|---|---|---|
| | (parts by weight) | | | | | | | |
| 4B | — | — | 220 | 95 | 636 | 380 | 23 | 88 |
| 9 | 18 | 36 | 121 | 57 | 203 | 300 | 14 | 82 |
| 10 | 48 | 36 | 113 | 50 | 176 | 370 | 22.5 | 82 |
| 11 | 60 | — | 102 | 102 | 949 | 140 | 48.5 | 96 |
| 12 | 60 | 18 | 148 | 100 | 235 | 200 | 30 | 90 |
| 13 | 60 | 36 | 135 | 76 | 166 | 220 | 14.5 | 82 |
| 14 | 60 | 48 | 87 | 39 | 149 | 350 | 23 | 83 |
| 15 | 60 | 60 | 77 | 40 | 97 | 330 | 22.5 | 76 |
| 16 | 72 | 60 | 90 | 46 | 123 | 270 | 21 | 79 |
| 17 | 84 | 60 | 111 | 71 | 160 | 180 | 20 | 84 |
| 18 | 105 | 60 | 95 | 85 | 227 | 120 | 34 | 88 |
| 19 | 105 | 90 | 80 | 55 | 104 | 170 | 22 | 80 |

An elastoplastic composition of the invention comprising polyethylene as the polyolefin resin is illustrated in Table III. The composition and the procedure of preparation are the same as Example 4 except 40 parts by weight of polyethylene (blow molding grade resin having melt index of 0.6 g./10 min, sp.g. 0.960 and ultimate elongation of 600%) is used in place of polypropylene. The data show that a substantial improvement in tensile strength, toughness and tension set are achieved by curing the rubber.

TABLE III

| Ex. no. | Curative | TS, Kg./cm² | 100%M, Kg./cm² | E, Kg./cm² | U.E. % | TS²/E, Kg./cm² | Ten. set, % | Hardness, Shore D |
|---|---|---|---|---|---|---|---|---|
| 20A | No | 48 | 52 | 561 | 170 | 4 | 73 (45) | 30 |
| 20B | Yes | 152 (104) | 82 | 542 | 310 | 43 | 28 | 34 |

Elastoplastic compositions of the invention comprising different types of butyl rubber are illustrated in Table IV. The compositions and the procedure of preparation are the same as Example 4 except the type of butyl rubber is varied as indicated (Example 23 is a duplicate of Example 4 using the same rubber). The data demonstrate that a wide variety of butyl rubbers are of fully cured butyl rubber. Compositions of the invention exhibit similar increases in tensile strength upon curing with preferred compositions exhibiting tensile strengths of 100% or more than the uncured blend with more preferred compositions exhibiting tensile strengths of at least 200% or more than the uncured blend. See Tables I, III, IV and V.

TABLE V

| Ex. No. | Curative | TS, Kg./cm² | 100%M, Kg./cm² | E, Kg./cm² | TS²/E, Kg./cm² | U.E., % | Ten. set,% | Hardness, Shore D | $\nu/2 \times 10^{-5}$ | Insoluble cross-linked rubber weight percent | |
|---|---|---|---|---|---|---|---|---|---|---|---|
| | | | | | | | | | | boiling xylene | cyclohexane at room temp. |
| 27 | 0 | 45 | 45 | 416 | 5 | 270 | 82 | 31 | 0 | — | — |
| 28 | 0.6 | 88 | 73 | 667 | 12 | 310 | 65 | 38 | 0.8 | 90 | 90 |
| 29 | 1.2 | 115 | 85 | 838 | 16 | 320 | 47 | 41 | 2.9 | 97 | 97 |
| 30 | 2.4 | 132 | 86 | 755 | 23 | 350 | 35 | 42 | 4.8 | 98 | 99 |
| 31 | 4.8 | 148 | 91 | 752 | 29 | 350 | 30 | 42 | 6.3 | 98 | 99 |
| 32 | 6.0 | 195 | 90 | 423 | 90 | 360 | 22 | 43 | 4.2 | 96 | 97 |
| 33 | 6.0 | 172 | 87 | 574 | 52 | 410 | 26 | 43 | 5.8 | 98 | 98 |
| 34 | 9.0 | 184 | 102 | 650 | 52 | 340 | 29 | 43 | 5.3 | 95 | 97 | satisfactory and that the degree of unsaturation or the Mooney Viscosity of the uncross-linked rubber does not substantially affect the physical properties of the resulting elastoplastic compositions.

Elastoplastic compositions of the invention in which the rubber is cross-linked using a sulfur curative system are illustrated in Table VI. The procedure of preparation is the same as in Table I. The blend comprises a

TABLE IV

| Example No. | Type of Rubber | TS, Kg./cm² | 100%M, Kg./cm² | E, Kg./cm² | TS²/E, Kg./cm² | U.E., % | Ten. set,% | Hardness, Shore D |
|---|---|---|---|---|---|---|---|---|
| 21A | Butyl rubber | 47 | 44 | 507 | 4 | 250 | 84 | 31 |
| 21B | 0.7 mole % unsaturation Mooney Visc. 65 | 178 | 76 | 511 | 62 | 440 | 23 | 35 |
| 22A | Butyl rubber | 69 | 63 | 806 | 6 | 310 | 73 | 35 |
| 22B | 1.5 mol. % unsaturation Mooney Visc. 50–60 | 191 | 84 | 555 | 66 | 430 | 24 | 34 |
| 23A | Butyl rubber | 45 | 45 | 416 | 5 | 270 | 82 | 31 |
| 23B | 1.6 mol. % unsaturation Mooney Visc. 70 | 194 | 90 | 568 | 66 | 350 | 24 | 37 |
| 24A | Butyl rubber | 31 | 31 | 310 | 3 | 180 | 82 | 28 |
| 24B | 2.2 mol. % unsaturation Mooney Visc. 46 | 162 | 79 | 517 | 51 | 370 | 24 | 32 |
| 25A | Chlorobutyl rubber | 75 | 69 | 750 | 8 | 260 | 76 | 36 |
| 25B | 1.1–1.7 mol. % unsaturation Mooney Visc. 50–60 | 176 | 95 | 546 | 57 | 340 | 24 | 42 |
| 26A | Bromobutyl rubber | 84 | 70 | 761 | 9 | 380 | 70 | 36 |
| 26B[1] | (X-2) 1.8 to 2.4 wt. % Bromine, Mooney Visc. 52 | 129 | 92 | 716 | 23 | 300 | 31 | 42 |

[1]two parts by weight zinc oxide (instead of five) are charged per 100 parts by weight rubber.

The effect of the concentration of curative is shown in Table V. The blend composition comprises 60 parts by weight butyl rubber, 40 parts by weight polypropylene, 1.2 parts by weight zinc oxide (except Example 32) and the indicated quantities in part by weight of curing resin. The butyl rubber, polypropylene and curative are the same as in Example 4. The compositions are prepared in a Brabender mixer by the procedure described above. Example 27 is a control without curative and Example 32 contains no zinc oxide. The data indicate that to fully develop good physical properties such as high tensile strength and low tension set that the quantity of curative should be sufficient to give a cross-link density of greater than $2 \times 10^{-5}$ moles per milliliter of rubber and that gel content should be greater than 90% of the rubber in the composition. The change in tensile strength upon curing is indicative of the state of cure with a 100% increase in tensile strength being indicative mixture of 60 parts by weight butyl rubber and 40 parts by weight polypropylene (The rubber and polyolefin resin is the same as in Example 4). Example 35, a control, comprises a mixture of the butyl rubber and polypropylene without any other additives. Example 36 illustrates a semi-efficient cure system using a high accelerator sulfur ratio and Example 37 illustrates a conventional sulfur cure system using high quantities of sulfur. The cure system of Example 36 consists of (all parts by weight) 3.0 parts zinc oxide, 0.6 parts stearic acid, 1.2 parts bis-2-benzothiazolyl disulfide, 0.6 parts tetramethyl thiuram disulfide and 0.6 parts sulfur. The cure system of Example 37 consists of (all parts by weight) 3.0 parts zinc oxide, 1.2 parts stearic acid, 0.45 parts bis-2-benzothiazolyl disulfide, 0.9 parts tetramethyl thiuram disulfide and 1.8 parts sulfur. The data demonstrate that satisfactory elastoplastic composition may be obtained with sulfur cure systems.

TABLE VI

| Ex. No. | TS, Kg./cm² | 100%M, Kg./cm² | E, Kg./cm² | U.E., % | TS²/E, Kg./cm² | Hardness, Shore D | Ten. set,% |
|---|---|---|---|---|---|---|---|
| 35 | 56 | 53 | 503 | 260 | 6 | 27 | 74 |
| 36 | 119 | 59 | 424 | 470 | 33 | 32 | 27 |
| 37 | 166 | 110 | 838 | 310 | 33 | — | 23 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of from about 20 to 45 parts by weight of thermoplastic crystalline polyolefin resin and from about 80 to 55 parts by weight of butyl rubber, chlorobutyl rubber, or bromobutyl rubber per 100 total parts by weight of polyolefin resin and rubber wherein the rubber is dispersed particles of cross-linked rubber which composition is processable as a thermoplastic and is elastomeric.

2. The composition of claim 1 containing from 20 to 150 parts extender oil per 100 parts by weight butyl rubber.

3. The composition of claim 2 in which the polyolefin resin is polypropylene or polyethylene.

4. The composition of claim 2 in which the blend comprises about 25–45 parts by weight of polypropylene and about 75–55 parts by weight of butyl rubber per 100 total parts by weight of polyolefin and butyl rubber.

5. The composition of claim 4 in which the rubber is cross-linked to the extent that the rubber is at least 90% by weight insoluble in boiling xylene or to the extent that the rubber contains at least about $2 \times 10^{-5}$ moles of effective cross-links per milliliter.

6. The composition of claim 5 in which the rubber is cross-linked to the extent that it contains at least $4 \times 10^{-5}$ moles of effective cross-links per milliliter.

7. The composition of claim 5 in which the blend comprises about 30 to about 40 parts by weight polypropylene and about 60 to about 70 parts by weight butyl rubber per 100 parts by combined weight of polypropylene and butyl rubber.

8. The composition of claim 1 prepared by masticating the blend and cross-linking agent at cross-linking temperature until the rubber is cross-linked.

9. The composition of claim 8 wherein the curative is a phenolic-aldehyde curing resin.

10. The composition of claim 1 in which toughness, $TS^2/E$, is at least 50 Kg./cm² wherein TS is ultimate tensile strength and E is Young's modulus.

11. The composition of claim 1 having a high temperature stability of such that the change in length at 185° C. for 5 minutes under a stress of 0.2 Kg./cm² is no more than 7% of its original length at room temperature.

12. The composition of claim 1 having a tensile strength 100% greater than the uncured blend.

13. The composition of claim 11 having a tensile strength of 200% or more of the uncured blend.